United States Patent [19]
Langenecker

[11] Patent Number: 6,123,483
[45] Date of Patent: Sep. 26, 2000

[54] METHOD AND APPARATUS FOR DECONTAMINATING SOIL AND MUD POLLUTED WITH HAZARDOUS WASTE AND PETROLEUM PRODUCTS

[76] Inventor: Bertwin Langenecker, 29 Woodside Dr., Moraga, Calif. 94556

[21] Appl. No.: 09/285,896

[22] Filed: Apr. 8, 1999

[51] Int. Cl.$^7$ .................... B09B 1/00; G21F 9/00
[52] U.S. Cl. .................. 405/128; 588/900; 210/619; 210/767; 210/768; 210/669
[58] Field of Search ............ 405/128; 210/619, 210/767, 768, 671, 669; 588/900

[56] References Cited

U.S. PATENT DOCUMENTS

| | | | |
|---|---|---|---|
| 4,289,626 | 9/1981 | Knopp et al. | 210/669 |
| 4,834,300 | 5/1989 | Wojciechowski et al. | 241/24 |
| 4,927,293 | 5/1990 | Campbell | 405/128 |
| 4,969,775 | 11/1990 | Cappel et al. | 405/128 |
| 4,993,873 | 2/1991 | Tippmer | 405/128 |
| 5,172,709 | 12/1992 | Eckhardt et al. | 134/95.1 |
| 5,193,936 | 3/1993 | Pal et al. | 405/128 |
| 5,197,823 | 3/1993 | Cutshall et al. | 405/128 |
| 5,205,674 | 4/1993 | Chisholm et al. | 405/258 |
| 5,207,532 | 5/1993 | Mason et al. | 405/128 |
| 5,223,147 | 6/1993 | Rosenstock et al. | 210/768 |
| 5,246,309 | 9/1993 | Hobby | 405/128 |
| 5,344,255 | 9/1994 | Toor | 405/128 |
| 5,439,597 | 8/1995 | Allen | 210/767 |
| 5,461,186 | 10/1995 | Lebowitz et al. | 588/249 |
| 5,569,155 | 10/1996 | Pal et al. | 588/256 |
| 5,588,947 | 12/1996 | Studer et al. | 588/252 |
| 5,599,137 | 2/1997 | Stephenson et al. | 405/128 |
| 5,690,284 | 11/1997 | Murray | 241/41 |
| 5,797,701 | 8/1998 | Conaway | 405/128 |
| 5,837,106 | 11/1998 | Ng et al. | 210/669 |
| 5,882,524 | 3/1999 | Storey et al. | 210/768 |
| 5,916,123 | 6/1999 | Pal et al. | 588/256 |
| 5,922,277 | 7/1999 | Donhoff et al. | 210/767 |

*Primary Examiner*—David Bagnell
*Assistant Examiner*—Alexandra Pechhold
*Attorney, Agent, or Firm*—Herbert L. Lerner; Laurence A. Greenberg; Werner H. Stemer

[57] ABSTRACT

Soil and mud of any kind may be decontaminated of its hazardous substances and petroleum products. The materials are mixed with water for soil and mud washing in a wet-type mixing and grinding mill. The washed out material is separated from the eluate which carries away the pollutants extracted from the soil and mud. The cleaned material can be safely returned to nature. The contaminated eluate is exposed to sorption media, such as lignite (brown coal, wood coal) ground to a particle size of a few microns. The sorption media adsorb the pollutants in the eluate fully. After removing the (solid) sorbens from the (liquid) eluate, they can be disposed of or treated for recycling. The eluate, now practically free of hazardous substances, may be released into surface or ground water, or may be pumped back into the industrial water recirculation system. The apparatus includes a wet-type mill which is fed from a soil and mud staging area and from the water recirculation system. The mixture of soil and mud with the wash water undergoes dewatering in a belt filter press. The eluate is intimately mixed in the adsorber with sorption media. The sorption media with the adsorbed pollutants are separated from the eluate. The remaining volume (or mass, respectively) now amounting to less than 1.5% of the original volume (mass) of the soil and mud treated, can be deposited in hazardous waste dumps, or they may undergo further treatment for recycling of valuable elements.

17 Claims, 6 Drawing Sheets

METHOD AND APPARATUS FOR DECONTAMINATING SOIL AND MUD POLLUTED WITH HAZARDOUS WASTE AND PETROLEUM PRODUCTS

BACKGROUND OF THE INVENTION

Field of the Invention

The invention lies in the field of environmental technology. Specifically, the invention relates to a method for the decontamination of soil and mud or sludge of any kind which are contaminated with hazardous substances and petroleum products.

The ever increasing environmental awareness has produced more stringent laws and regulations for the protection of human and animal health. At least in the developed countries it is no longer tolerated for contaminated soil to be deposited in open landfills, while special deposit sites for hazardous waste are limited and expensive. Therefore, a worldwide search is under way for new and improved technologies that provide better, faster and less expensive environmental clean up of contaminated sites and materials.

For a time it was common practice to burn or bury contaminants (the latter after the hazardous material concentrates had been encapsuled in cement or glass). One example is in situ vitrification, where metals are at 1600° C. capsuled in molten silicate structures. In recent years other technologies have been increasingly applied, for instance technologies based on biological in situ and ex situ activities, where microorganisms are introduced into the soil to create chemical and/or physical activities, the end product is typically $CO_2$ and $H_2O$.

There are other chemical methods (hazardous materials are converted to less dangerous materials, typically by reduction and sometimes also by oxidation), and extraction of hazardous materials by means of solvents.

In situ flushing operations wash away contaminated areas in the soil or in the groundwater with large amounts of water (provided the flushing water can be isolated and separated efficiently). Instead of using water, it is also possible to separate volatile organic substances from soil with (hot) steam. However, this requires an after-treatment of the extracted materials.

Washing of contaminated soil is conventional. Water can cleanse contaminating substances from soil, gravel and rocks mechanically. Water also may separate fine-grained particles (silt and clay) from coarse-grained particles (sand and gravel). In this case the water is loaded with the contaminants from the soil and needs to be treated adequately, before it can be reused or returned to surface and ground water.

To improve the cleaning power of water it has been suggested (German Patent Application DE 195 23007 A1; Duro Galvanit Chemie) to add detergents and have the water stream through the tank upwards. Surface active detergent should preferably be added. It is claimed that the upwardly streaming water creates—at adequate stream velocity—a layer of solid material. Multi-step washing procedures and continuously or intermittently draining of some of the wash water are the to complete the process of soil washing. They also imply however, that besides chemical additives (detergents) several steps of washing are necessary, thus this washing process takes up a considerable amount of time.

Likewise chemical additives shall be applied to the wash water for soil washing according to Ansaldo Volund A/S (Published International Application WO 98/082). There, additives are suggested which stabilize chemically the materials to be treated using a solution containing ferrous ions which allows the formation of stabilizing ferric oxides on the materials. The oxidized material is then heat-treated, at various temperatures (0° C. to 1300° C.), and carried out in several steps, in a furnace for obtaining melting or sintering with other products. The wash water is then oxidized, its pH regulated, and finally discharged. Supplementary, also embedding in concrete and covering with other solid materials are recommended. That prior art method is complex, time consuming and expensive. This is not to say that it does not have its proper place cleanup processes in which, due to the quantity and form of the contaminants in the soil and mud, several processes and technologies need to be combined in order to achieve the desired cleanup. This renders soil remediation expensive and time consuming. These facts impede the realization of ambitious endeavors such as those published in "Cleaning Up the Nation's Waste Sites" (U.S. Environmental Protection Agency; EPA 542-R-96-005A /1996 Edition). According to that text, the next 20 to 30 years will see a commitment of several billion dollars annually for the clean-up of sites contaminated with hazardous waste and petroleum products.

SUMMARY OF THE INVENTION

Accordingly, it is an object of the invention to provide a method and apparatus for soil remediation, which overcomes the hereinfore-mentioned disadvantages of the heretofore-known devices of this general type, and which provides an economical, nonpolluting way to solve the present worldwide environmental problem, as outlined above, of the large sites and quantities of soil and mud which exist and/or are being created.

With these objects in view there is provided, in accordance with the invention, a method of treating soil and mud that is contaminated with hazardous waste or petroleum products. The method comprises the following steps:

intimately mixing a contaminated material with water in a wet-type mixing and grinding mill, thereby agitating the water and producing intense turbulences markedly reducing a surface tension of the water, and washing the material with the water and forming an eluate;

separating less contaminated larger particles from more contaminated smaller particles with alternating forces acting in the mixing and grinding mill; and exposing the more contaminated smaller particles together with the eluate to mechano-chemically activated sorption media and cleaning the eluate with the sorption media.

The invention, in short, provides for washing of soil and mud with water under mechanical energy impact and a subsequent separation of the eluate to greatly reduce the volume of material containing the hazardous substances.

In accordance with an added feature of the invention, chemicals are added to the water prior to eluting the material for enhancing a degree of elutriation.

In accordance with an additional feature of the invention, the sorption media added to the eluate are added in proper phase, either in solid phase, in liquid phase, or in gaseous phase.

In accordance with another feature of the invention, the exposing step comprises adding solid sorption media to the eluate. The solid sorption media may be added prior to, during, or after the grinding.

In accordance with a further feature of the invention, the solid sorption media are ground in an atmosphere of inert gas. This prevents dust explosions and prevents new surfaces created by the grinding from contaminating before sorbens come in touch with the eluate.

In accordance with again an added feature of the invention, adsorption is promoted by adjusting a pH in a weak alkaline range, such as in a range of 8 to 11, by adding acid or base.

With the above and other objects in view there is also provided, in accordance with the invention, a plant for carrying out the above-outlined method:

a staging area for receiving contaminated material;

a wet-type mixing and grinding mill connected to receive from the staging area the contaminated material;

a plurality of interconnected devices including an adsorber, a breaker for sorption media, and a pulverizer, and a transport system connected between the devices for transporting materials and substances through the plant and between the devices;

the mixing and grinding mill having an inlet formed therein, and the material is mixed in the mill with wash water entering through the inlet;

the mill carrying tools selected from the group consisting of balls, rods, pinned disc, pendelum beater tools, cross beaters, vortex rotors, knives for knife mills, and hammers for hammer mills, and mixing and grinding the mixture with the tools, whereby a motion of the tools agitates the mixture creating turbulences in the liquid, thus reducing the surface tension which enhances cleaning of the material being treated and supports separation of relatively larger particles from relatively smaller particles.

In accordance with again an additional feature of the invention, the plurality of interconnected devices further includes tanks and dewatering apparatus, a press, a decanter, a wash water tank, an inert gas container with a connecting pipe to the pulverizer, a container for solid material, and a trough for contaminated adsorption media.

In accordance with again another feature of the invention, the adsorption media crushed in the breaker are pulverized in the pulverizer in an inert gas atmosphere for preventing explosions and contamination of sorption active surfaces before sorbens is mixed with the eluate in the adsorber.

In accordance with again a further feature of the invention, an adsorption capacity of the sorbens is mechano-chemically activated by a mechanical energy supplied in the adsorber through the grinding tools in the mill.

In accordance with a concomitant feature of the invention, there is also provided a filter press, a Mohno pump for pumping the eluate from the filter press to the adsorber, and a feeding device for regulating an input of adsorbens to the adsorber.

The invention achieves its goal and objective by combining two effects well-known and established in physics and in chemistry for more than one hundred years. The invention exceeds the limits set forth by the above outlined status of the art in soil and mud clean up and remediation, in that it can be applied to contaminated soil and mud, even if the materials consist of components different in kind, quantity and form.

One of the two physical-chemical effects applied in this invention is related to the reduction of surface tension by alternating mechanical energy input, e.g. in turbulently streaming liquids. The other effect is based on mechano-chemical reactions.

As is known, the cleaning effect of soap and other washing substances (powder, etc.) is due to the "surface activity" (as consequence of the configuration of the anions and their accumulation in zones of the surface of water), causing the surface tension of water to be lowered; the liquid (water) becomes more mobile and enters more easily in capillary cavities, e.g., in rough surfaces of soils and mud, an so on. As a consequence of the reduced surface tension, also the access of adsorbing forces (van der Waal's force; rest valence surface molecules) to contaminating substances is improved.

The surface tension of water can be markedly reduced without soap or other additives, by physical means, e.g., by an intense alternating mechanical field (sound, ultrasound). Such a field can be produced by various means, e.g. by "Nultrasonic converters," which convert electric signals (at frequencies above ~15 kc) into mechanical vibrations; or by intermittent airflow (Galton Whistle) or turbulences in a water stream, which may carry moisturized soil, created by beater discs, or alike.

Less known than the mechanical effect on surface tension (of water, etc.,) are "mechano-chemical" reactions. Yet, there is a several centuries old Chinese method to produce red vermilion {HgS} by shaking a mixture of mercury and sulfur—a typical mechano-chemical synthesis. However, the first well defined explanation of the relation between mechanical and chemical energy and their transformation from one into the other date back to the middle of the last century only. Nevertheless, they did not receive much attention.

Geologists have long been aware of transformations of minerals due to mechano-chemical deformations, created by the pressure of mountains. While these phenomena occur over long periods of time, the effect of mechano-chemical reactions utilized in the invention takes place within seconds and even fractions of seconds.

Following the above enumeration and brief description of the presently available methods and technologies for decontaminating soil and mud polluted with hazardous waste and petroleum products, and having reminded of two relevant physical-chemical effects, the invention's disclosure ascertains: The invention is unique in that it mixes water with contaminated soil and mud, grinds the mixture, while at the same time applying mechanical energy (pressure) and friction to reduce the surface tension of the water and by applying mechanical vibrations separating the larger soil particles from the more heavily contaminated finer particles, thus reducing the volume of contaminated material to be subsequently treated with mechano-chemical activation, whereby the contaminants adhere to a sorption media and can thus be easily separated, disposed off or further treated for recycling.

The cleansed soil no longer presents a danger to humans and animals and can be safely returned to the environment. Accordingly all types of soil, sandy or rocky, and mud, can be treated and returned to nature. The sorption media containing the contaminants will be separated from the liquid phase of the mixture (discharged eluate) and can be treated or disposed off in accordance with accepted techniques. The separated water is sufficiently cleansed to be returned to rivers and streams, lakes and ponds, or can be recycled into the treatment cycle. The invention also relates to apparatus required for the operation of the method hereby presented.

Other features which are considered as characteristic for the invention are set forth in the appended claims.

Although the invention is illustrated and described herein as embodied in a method and device for decontaminating soil, mud and sludge polluted with hazardous waste and petroleum products, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
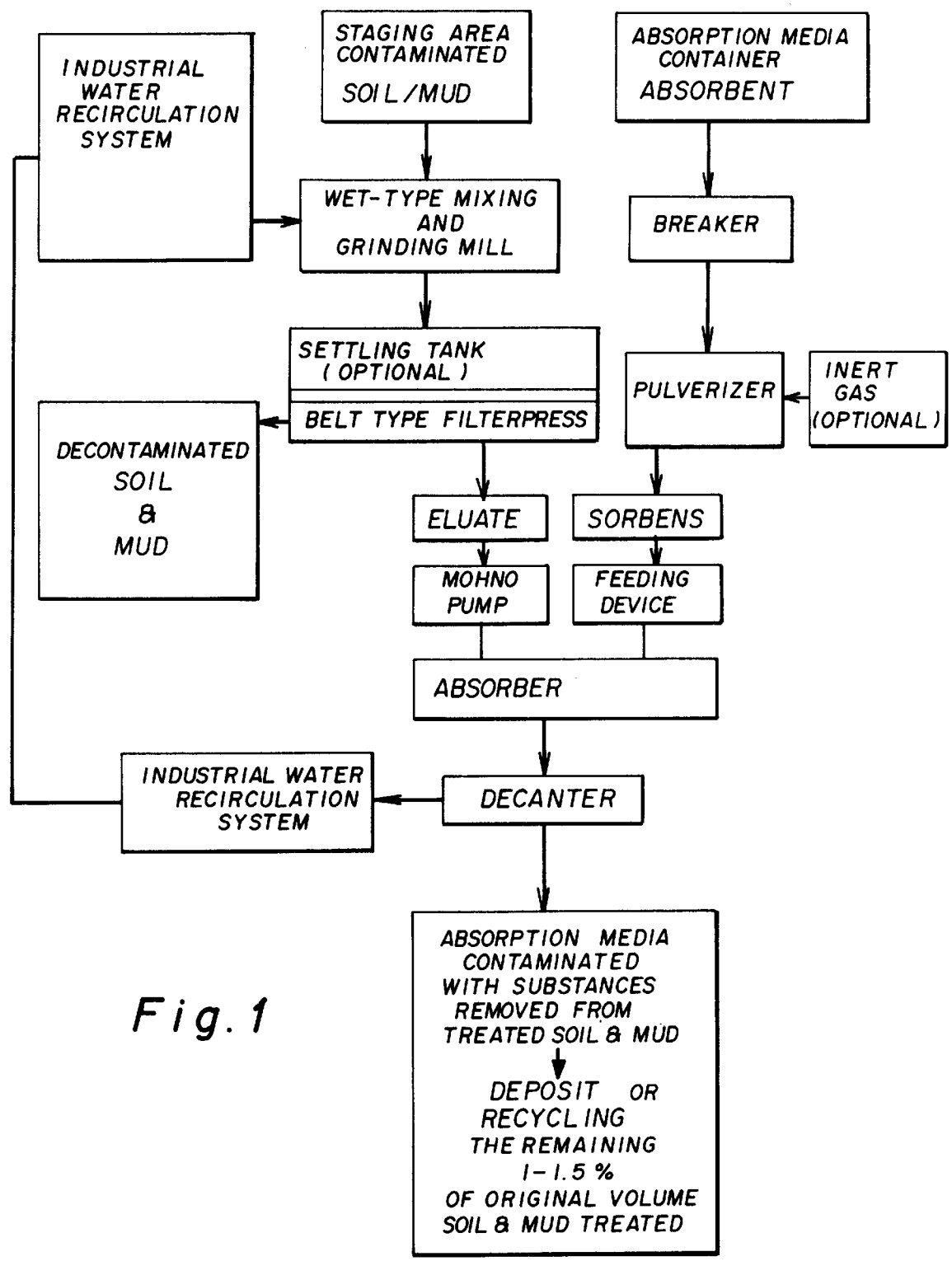
FIG. 1 is a flow diagram illustrating the method according to the invention.

Referring now to the figures of the drawing in detail and first, particularly, to FIG. 1 thereof, which outlines the complete process according to the invention. It should be noted, in this context, that the method of the invention comprises several treatment steps and activities and it is efficient only when the method steps are applied and operated as a whole.

In a first step of the process, the contaminated soil (mud, etc.) is dug up and moved to a staging area where it is prepared for treatment. The soil is then sifted to remove debris and large objects, such as rocks. The remaining material enters a wet-type mixing and grinding mill, in which the soil (and/or mud, etc.) is mixed with turbulently streaming wash water. It is thereby intensely agitated. Simultaneously, lumps and chunks are ground to smaller pieces and separated in the agitating field of alternating pressures. The wet-type grinding in a superimposed alternating mechanical field can be achieved by ball or rod mills, or the like. At lower throughput (i.e., $\leq 15$ tons/hour) universal mills may be used, with various types of grinding tools, which can be adapted to the material (soil, mud, sand, rocks, etc.) to be treated.

In the next step, the wash water (eluate) is drained out of the mill and the soil (mud, etc.) is rinsed with clean water. If testing for contaminants shows that the soil (mud, etc.,) is "clean," then the material can be used on the site or be taken elsewhere for backfill. If unacceptable levels of traces of contaminants are still present, the material may be subjected to another cycle of similar treatment in the mill and then dewatered, preferably in a belt type filter press, or alike, possibly in combination with a settling reservoir.

The eluate (filter effluent; filtrate) is pumped (by a Mohno pump or the like) into the so-called adsorber machine where it is mixed with an adsorption material. The adsorbent (preferably lignite; also called brown coal, woodcoal) enters the adsorber already ground to fine particles in a breaker and/or in a pulverizer. The multiple surfaces, created by pulverizing the adsorbent, are charged most efficiently by the contaminants channeled with the eluate into the adsorber. This occurs under the impact of high alternating pressures created in the grinding split of the pulverizer thus activating and enhancing mechano-chemical reactions. The adsorber is a machine quite similar to the wet-type mixing and grinding mill mentioned above. In some cases, one and the same mill may be used for both steps of processing.

In order to prevent self ignition and (dust) explosion, as well as top reserve the activated surfaces of the pulverized sorbens until the material reaches the inside of the adsorber, it is recommended that the adsorption material is pulverized in an atmosphere of inert gas (preferably nitrogen). In addition, the gas can be used to regulate the temperature profile in the adsorber, since it may be applied at any desired temperature.

Following the mechano-chemically activated process in the adsorber, the solids are dewatered in a decanting centrifuge or the like. The centrate (i.e., the effluent from the centrifuge) is practically free of hazardous substances, and thus may be released into surface or ground water, or maybe pumped back into the water recirculation system.

The solids removed from the decanting centrifuge carry the pollutants extracted from the soil and mud. Thus, they need to be deposited as "hazardous waste," or may undergo an after-treatment for recycling of valuable elements.

The volume of the "hazardous waste" amounts to 1 to 1.5% of the original volume of the soil and mud thus treated. Accordingly, the present invention provides a considerable relief for the deposit sites of hazardous waste. The remainder volume (i.e., 1–1.5% volume) can be even further reduced, if the lignite (brown coal, wood coal) is incinerated in units equipped with devices for flue gas purification. Thus the thermal energy of coal can be utilized and only the ash together with the filtrate of the flue gas purification remain to be deposited.

It is a consideration to recycle the hazardous substances, if they are valuable in other regards. The invention presents them adsorbed to the sorption media for easy access, if recycling is deemed economical.

Figure 2:
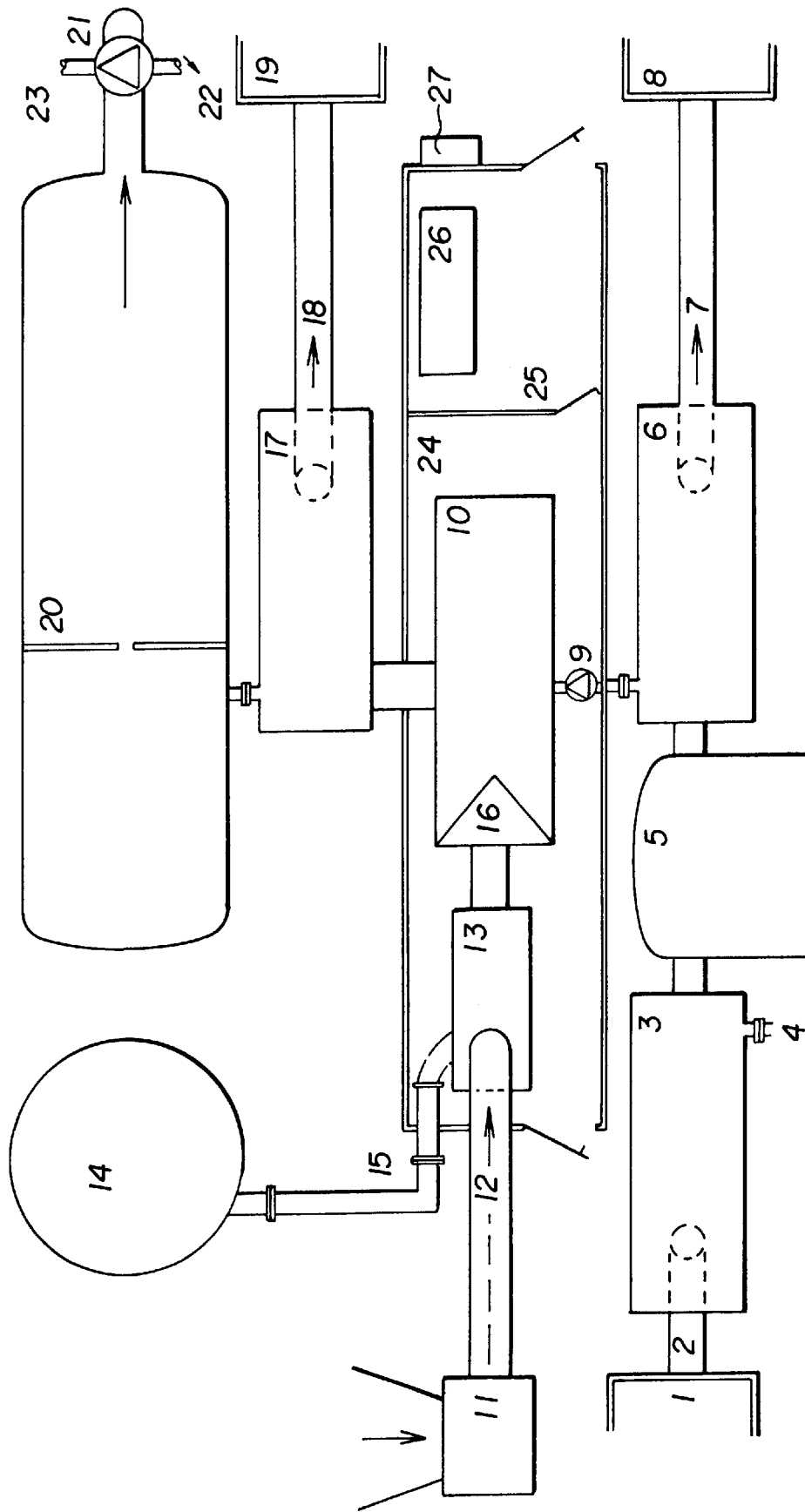
FIG. 2 is a schematic diagram of an apparatus for performing the novel method.

Referring now to FIG. 2, there is shown a staging area 1, from which the soil is removed and fed by means of a belt or screw conveyor 2, or the like, into the wet-type mixing and grinding mill 3. In the mill 3, the soil and mud is mixed intimately with water (industrial, process water) pumped into the mill through an inlet 4. In the mill, the mixture is agitated to produce intense turbulences which reduce the surface tension (as described above) and enhance the separation of the smaller solid particles from the larger ones.

Figure 3:
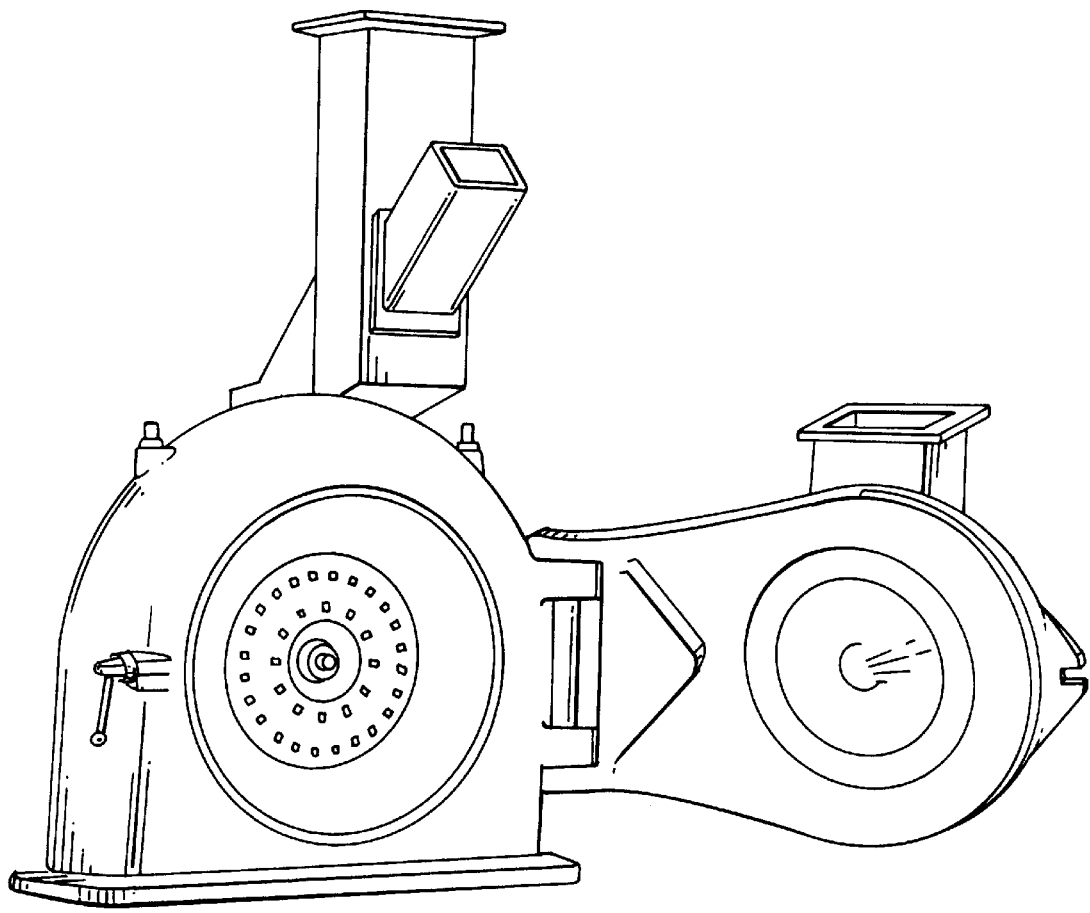
FIG. 3 is a perspective view of a wet mixing and grinding mill.

The efficacy of the method according to the invention has been demonstrated with a (universal-) mill as the wet-type mixing and grinding mill 3. Such a mill is shown in FIG. 3. The mill is equipped with a beater disk capable of accepting and grinding lumps (having diameters up to an inch) of soil and mud. Powered by a 37 KW electric motor, the mill has a throughput of $\leq 4$(metric) tons/h at 3,000 rpm. For large throughputs in the order of magnitude of 100 tons/h, wet-type rod and ball mills should be used, powered by (electric) motors having up to 1,000 KW power.

In a settling tank 5, some of the solid material sinks to the bottom of the tank by gravity, while the rest of solids contained in the mixture leaving the mill 3, is dehydrated in a belt type filter press 6. The separated solids are removed from the press 6, by means of a belt or screw conveyor 7, into the container 8, which is designed for easy loading and transport by a truck to a site for backfill or landfill, respectively.

The eluate (centrate from 6) is fed by a pump 9 (for instance a Mohno pump) into the adsorber machine 10, which is similar to the wet-type mixing and grinding machine 3 shown in FIG. 3.

In the adsorber 10, the eluate is mixed with the adsorption substance (e.g., lignite) which is broken into small pieces (diameter ≦17.5 mm, ½ inch) in the(lignite-) breaker 11, transported by a (screw) conveyor 12 into the pulverizer 13. The pulverizer 13 is of the same type as the adsorber 10, yet equipped with a vortex rotor (designed particularly for pulverizing lignite into particles in the diameter range of a few microns. In the experimental unit that was assembled for demonstrating the invention, the pulverizer 13 is powered by an electric motor of ~6 KW having a throughput of ≦70 kg/h powderized lignite at 6,000 rpm. 40–60 kg/h lignite is necessary to adsorb the contaminating substances extracted into an eluate, which results from an input of ≦4 tons/h soil and mud into the mixing and grinding mill 3 described above. In order to prevent self ignition and explosions during pulverizing in 13, it is advisable to grind lignite in an atmosphere of inert gas (e.g., nitrogen) stored in the tank 14 and fed into the mill 13 through pipe 15. The pulverized adsorption material enters the adsorber machine 10 through a feeding device 16 in dose rates according to the input (flow) of eluate into the adsorber 10. (Commercial activated carbon has active surfaces of up to several hundred $m^2/g$, typically up to approx. 700 $m^2/g$); nevertheless, lignite (also called brown coal, wood coal) with its 30–50 $m^2/g$ active surface is, according to this invention, superior in that it is much more economic. For the sake of simplicity, FIG. 2 does not show the device which allows for heating or cooling the inert gas, which determines the temperature profile in the adsorber 10. Further for the sake of clarity, FIG. 2 does not show the accessory equipment for additives to regulate the pH value of the eluate. Those skilled in the art will understand that the efficiency of many adsorption substances is best in the range of 8–11 pH.

From the output of the adsorber 10 the mixture of eluate and sorption media is piped into a decanter 17. From there, the dewatered solids are processed by a conveyor 18 into the tank 19, from where they are removed by any kind of transportation means (truck or alike). It should be mentioned that the dewatered solids still contain some moisture. Anyhow, this product contains practically all of the pollutants extracted from the soil and mud treated, and thus the material removed from the decanter 17 is toxic. Accordingly, it has to be deposited at hazardous waste deposit sites. Nevertheless, the volume of this material amounts to 1–1.5% of the original volume of the soil and mud entering the staging area 1, and thus represents a substantial relief from the primary problem of hazardous waste deposit.

The centrate (effluent from the decanter 17) is accumulated in a reservoir 20 and may, if proven to be clean, be discharged to surface or ground water through a valve at 21, or it may-return into the water recirculation system through the valve at 22. Valve position 23 allows fresh wash water to be added to the water recirculation system.

The mill 13 and the adsorber 10 of the prototype unit are installed in a weatherproof container 24 which also houses a control and lunch room 25 with its control panel 26 supplied by electric energy through an electrical panel or breaker box 27.

The wet-type mixing and grinding mill 3, the adsorber machine 10, as well as the mill 13 of the prototype unit are similar in their exterior and look the same as shown in FIG. 3. For their individual purpose, they are, however, equipped with different kinds of "tools." The mill 3 has a beater disk (as indicated in FIG. 3). The mill 13 comprises a so-called vortex rotor (developed particularly for pulverizing lignite and the like). The adsorber 10 is equipped with a "tool" illustrated in FIGS. 4A and 4B. The "tool" consists of the stator 28, connected by the inlet hose 29 to the above mentioned pump 9 wherefrom the adsorber 10 receives the eluate, and of the rotor 30. The sorption media enter the adsorber at A, an opening in the front door of the adsorber machine (shown in FIG. 3 open), and is guided by a conical cap 31 of the rotor 30 towards the grinding slit. The grinding slit is defined by the blades 32 of the rotor 30 and the blades 33 of the stator 28 which are arranged conically, as indicated in FIG. 4B.

Figure 4A:
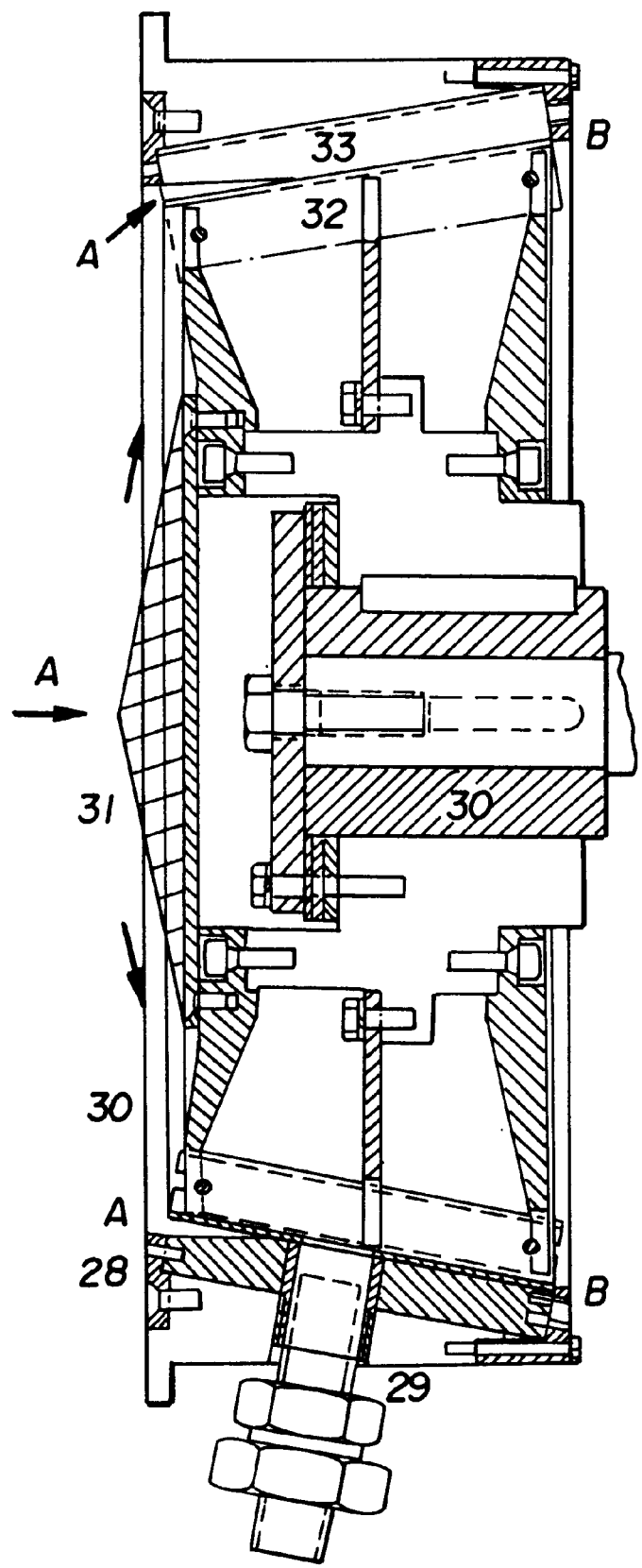
FIG. 4A is a sectional side view of a tool useable in the mill of FIG. 3.
Figure 4B:
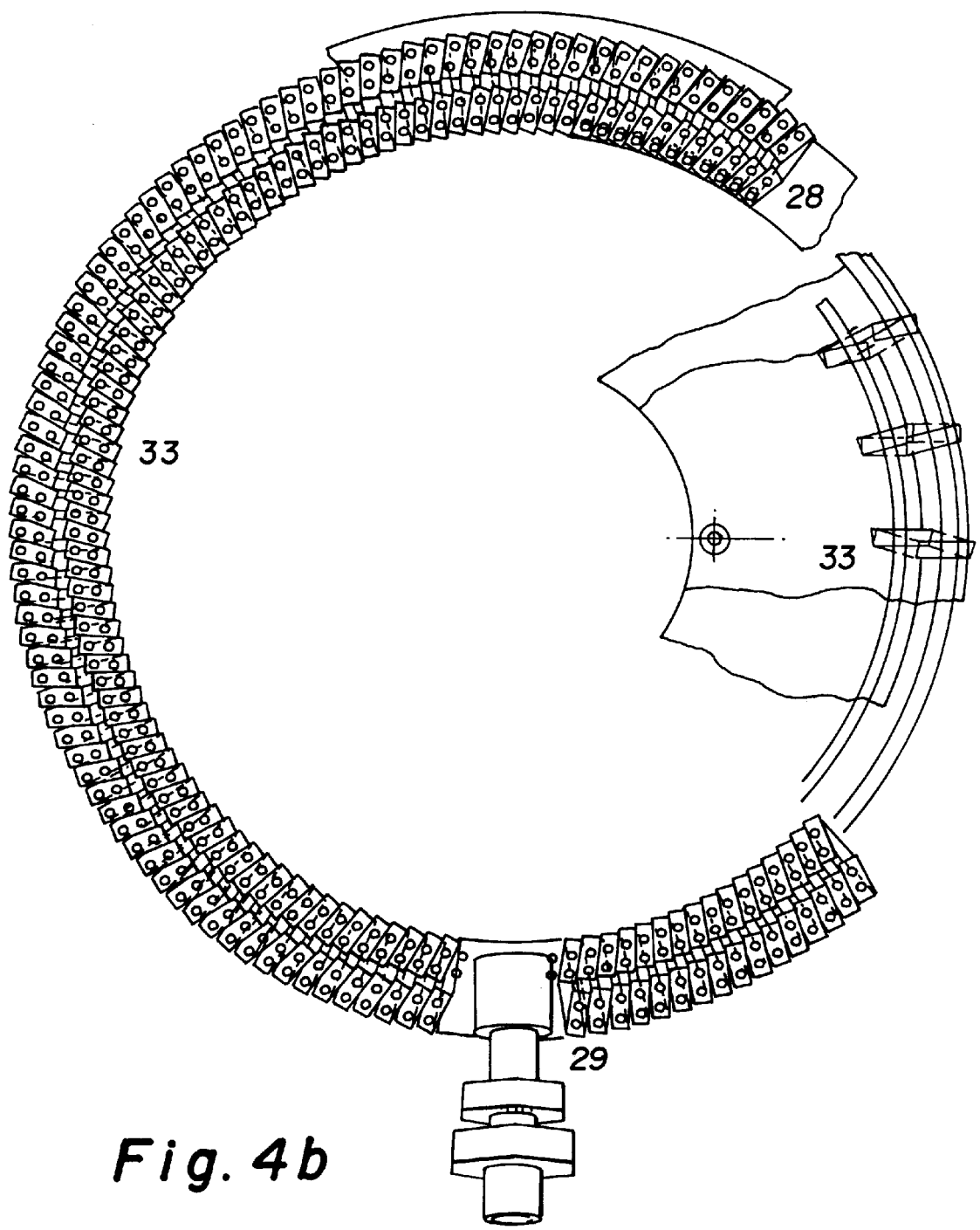
FIG. 4B is a diagrammatic plan view onto the tool array shown in FIG. 4A.
Figure 5:
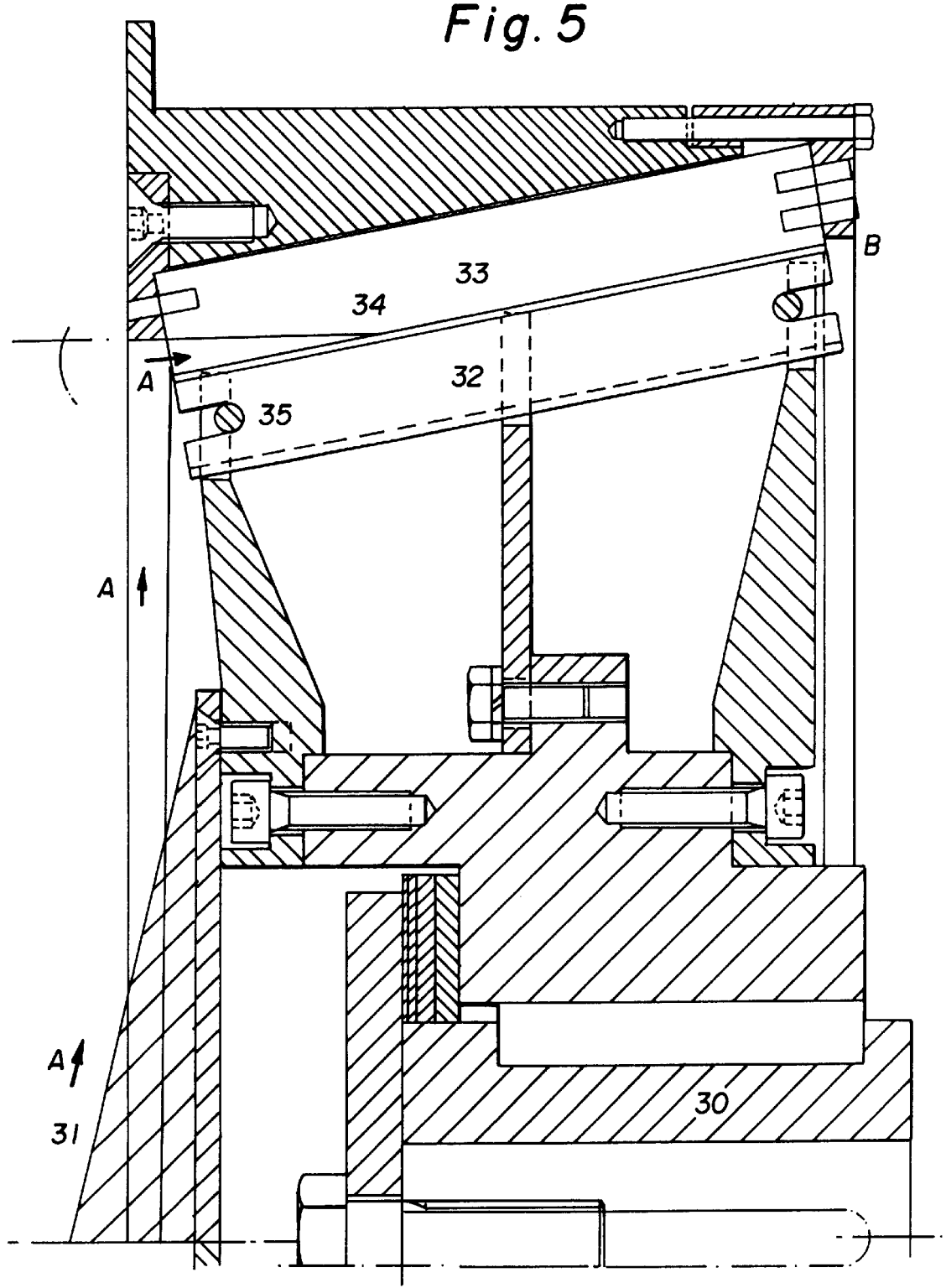
FIG. 5 is a partial sectional view of an enlarged detail of the mill shown in FIG. 4A.

Referring now to FIG. 5, there is shown the upper half of FIG. 4A in actual size of the stator and rotor in the mill used in the prototype unit. At 34 in blade 33 the grinding slit opens at an angle (*) thus allowing even somewhat larger pieces and lumps (diameter up to several millimeters) to enter the narrow grinding slit defined by the blades 32 and 33, respectively. The material to be treated enters at A and leaves the grinding slit at B. The position of the point 34 and the angle (*) are chosen and defined by the kind of material (i.e., the mixture of eluate and sorbens) to be treated.

The blades 32 and 33 are designed to be secured by pins 35; this allows for easy exchange of blades when needed, e.g., for sharpening, hardening treatment, and the like.

I claim:

1. A method of treating contaminated soil and mud, which comprises:

intimately mixing a contaminated material with water in a wet-type mixing and grinding mill, thereby agitating the water and producing intense turbulences markedly reducing a surface tension of the water, and washing the material with the water and forming an eluate;

separating less contaminated larger particles from more contaminated smaller particles with alternating forces acting in the mixing and grinding mill; and exposing the more contaminated smaller particles together with the eluate to mechano-chemically activated sorption media and cleaning the eluate with the sorption media.

2. The method according to claim 1, wherein the material is polluted with hazardous waste and petroleum products.

3. The method according to claim 1, which comprises adding chemicals to the water prior to eluting the material for enhancing a degree of elutriation.

4. The method according to claim 1, wherein the sorption media added to the eluate are in a phase selected from the group consisting of solid phase, liquid phase, and gaseous phase.

5. The method according to claim 1, wherein the exposing step comprises adding solid sorption media to the eluate.

6. The method according to claim 5, wherein the solid sorption media are added to the eluate prior to the grinding step.

7. The method according to claim 5, wherein the solid sorption media are added to the eluate during the grinding step.

8. The method according to claim 5, wherein the solid sorption media are added to the eluate after the grinding step.

9. The method according to claim 1, which comprises grinding solid sorption media in an atmosphere of inert gas.

10. The method according to claim 9, wherein the sorption media are ground in an inert atmosphere to prevent dust explosions and to prevent new surfaces created by the grinding to contaminate before sorbens come in touch with the eluate.

11. The method according to claim 1, which further comprises promoting adsorption by adjusting a pH in a weak alkaline range.

12. The method according to claim 11, wherein the adjusting step comprises adding one of acid and base to adjust the pH in a range of 8 to 11.

13. A plant for carrying out the method according to claim 1, comprising:

a staging area for receiving contaminated material;

a wet-type mixing and grinding mill connected to receive from said staging area the contaminated material;

a plurality of interconnected devices including an adsorber, a breaker for sorption media, and a pulverizer, and a transport system connected between said devices for transporting materials and substances through the plant and between said devices;

said mixing and grinding mill having an inlet formed therein, and the material is mixed in said mill with wash water entering through said inlet;

said mill carrying tools selected from the group consisting of balls, rods, pinned disc, pendelum beater tools, cross beaters, vortex rotors, knives for knife mills, and hammers for hammer mills, and mixing and grinding the mixture with said tools, whereby a motion of said tools agitates the mixture creating turbulences in the liquid, thus reducing the surface tension which enhances cleaning of the material being treated and supports separation of relatively larger particles from relatively smaller particles.

14. The plant according to claim 13, wherein said plurality of interconnected devices further includes tanks and dewatering apparatus, a press, a decanter, a wash water tank, an inert gas container with a connecting pipe to said pulverizer, a container for solid material, and a trough for contaminated adsorption media.

15. The plant according to claim 13, wherein the adsorption media crushed in said breaker are pulverized in the pulverizer in an inert gas atmosphere for preventing explosions and contamination of sorption active surfaces before sorbens is mixed with the eluate in said adsorber.

16. The plant according to claim 13, wherein an adsorption capacity of the sorbens is mechano-chemically activated by a mechanical energy supplied in said adsorber through said grinding tools in said mill.

17. The plant according to claim 13, wherein said devices further comprise a filter press, and including a Mohno pump for pumping the eluate from said filter press to said adsorber and a feeding device for regulating an input of adsorbens to said adsorber.

* * * * *